Sept. 12, 1933.   E. P. DORMAN   1,926,764
GLASS FEEDING APPARATUS
Filed June 5, 1931
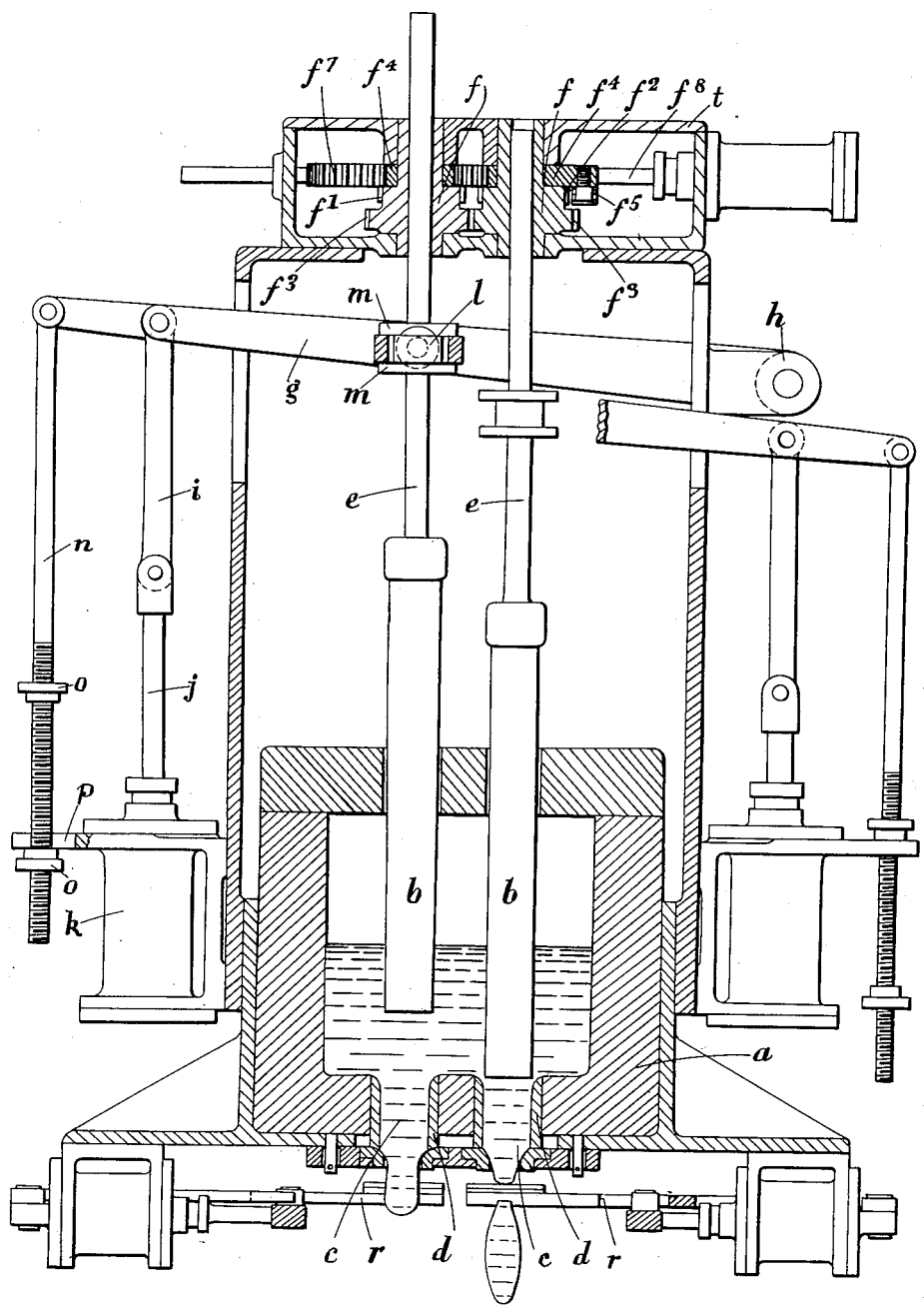
INVENTOR
Edgar Philip Dorman
BY
ATTORNEY Patented Sept. 12, 1933

1,926,764

UNITED STATES PATENT OFFICE 1,926,764

GLASS FEEDING APPARATUS

Edgar Philip Dorman, London, England, assignor to The United Glass Bottle Manufacturers Limited, London, England, a British company Application June 5, 1931, Serial No. 542,423, and in Great Britain November 3, 1930

8 Claims. (Cl. 49—55)

This invention relates to glass feeding apparatus, and particularly to glass feeders used for supplying molten glass in predetermined quantities to glass forming or shaping machines for making various kinds of glassware.

In some forms of glass feeding apparatus of this nature the melting furnace is provided with a trough like extension in the bottom of which is formed an orifice through which the glass is permitted to flow by gravity to a series of moulds, which are in turn positioned beneath the orifice, the flow of glass through the orifice being assisted or controlled by a vertically movable plunger arranged in axial alignment with the orifice. Usually the moulds are mounted upon a mould table which is rotated continuously, and the operations synchronized so that a gob or gather of glass is delivered to each of the moulds as they pass in turn beneath the feeder orifice. With the development of this class of forming machines and the increases in the speed of revolution of the mould tables it has become necessary to provide a feeder capable of operating at correspondingly high rates.

One of the defects of the feeders at present in use is that they cannot be operated above the well-known limit of speed at which a feeder plunger can be operated successfully to produce and deliver gathers of the correct weight and form. Another defect resides in their inability to feed more than one weight or form of gather at a time, and it is the object of the present invention to provide an improved form of feeder which is capable of overcoming these and other defects.

According to the invention a glass feeder is provided having two or more orifices each controlled by a separate plunger, and means is provided for enabling each plunger to be operated or controlled independently of the other plunger or plungers. By this arrangement the speed of rotation of the forming machine can be multiplied, and the individual speeds of operation of the plungers maintained normal, or kept within the limit of speed above referred to so that one of the plungers serves certain of the moulds, while the other plunger or plungers serve the other moulds. For instance, in the case of a feeder equipped with two orifices the plungers can be operated alternately so as to feed charges of glass of equal weight and form at a high speed while the individual speeds of operation of the plungers are maintained at half of that speed. Alternatively, by employing orifices of different dimensions, and/or by suitably adjusting the plungers, the feeder can be operated so that it delivers charges of different weights or forms, and in this way by arranging the plungers so that they operate in ordered sequence they may deliver to a set of moulds of varying form and capacity, arranged in similar sequence upon a forming machine, glass in charges suitable for making an equal number of different types of ware concurrently. If desired, the multiple plunger feeder may be arranged or adjusted so that the plungers operate simultaneously to deliver two or more (according to the number of orifices provided) charges of glass to each mould, the moulds being provided with a plurality of cavities or matrices for forming or shaping the glass.

In order that the said invention may be clearly understood and readily carried into effect, the same will now be more fully described with reference to the accompanying drawing which illustrates by way of example, one convenient mode of carrying the invention into effect as applied to a twin plunger feeder.

In the accompanying drawing $a$ is the feeder trough which is open at the furnace end for the admission of molten glass thereto, and in which the glass is maintained at a constant level, $b,b$ are the plungers which are composed of fireclay or other suitable refractory material, and $c,c$ are the orifices which are formed in the bottom of the feeder trough immediately below and in axial alignment with the plungers. The orifices are preferably fitted with replaceable bushings or rings $d, d$ so as to permit the size or form of orifice opening to be varied according to the class of ware to be manufactured and the plungers are arranged so that they pass through suitable openings formed in the upper part of the feeder trough, the upper ends of the plungers being secured to a pair of plunger stems $e, e$ capable of sliding vertically in the guides $f, f$.

Suitable means are provided for reciprocating the plungers, such means being preferably pneumatically operated. In the arrangement illustrated, a separate pneumatically operable piston is provided for the operation of each plunger. It will be evident, however, that in some instances the plungers may be operated from a common operating means and provided with means for permitting independent control of the individual plungers. The arrangement for actuating the left-hand plunger in the drawing comprises a lever $g$ which is pivoted at its right hand end $h$ to a suitable stationary support and is connected at a point adjacent its other end by a link $i$ to the piston rod $j$ of a piston slidably mounted in a vertical cylinder k arranged in a convenient position on the feeder wall. At a suitable point intermediate its ends the lever g is connected with the plunger stem e so that vertical movement of the piston will cause the plunger to move towards and away from the orifice c. This connection may be provided by forming a projection l on the lever g and by providing the plunger stem with a pair of flanges m arranged so that they engage the upper and lower surfaces of the projection l. A similar arrangement is provided for actuating the other plunger, the compressed air cylinder being, in this instance, disposed on the opposite side of the feeder. In order to provide for the adjustment of the plunger strokes, the levers g, g, are preferably provided with the usual form of screw threaded rod n carrying a pair of adjustable nuts o which co-operate with a fixed stop p on the cylinder and limit or determine the length of the stroke of the plunger.

Each of the orifices c is also provided with a suitable severing or shearing means r for completing the dividing of the glass streams into the individual gobs or gathers for delivery to the moulds. Such shearing means are, as usual, mounted immediately beneath the feeder orifices and are arranged to be operated by compressed air in timed relation with the operation of the plungers, the timing of the operations of the plungers and of the shears being accurately controlled by any suitable known form of timing device, such as for example, the feeder timer frequently used in conjunction with glass feeding apparatus. This device usually consists of a series of cams mounted upon a common shaft which is rotated at a constant speed either by gearing from the forming machine or from an independent source of power, each cam being adapted to operate one of a series of valves which control the admission and exhaust of compressed air to the cylinders which control the raising and lowering of the plunger, and the opening and closing of the shears, and each cam being capable of angular adjustment upon the cam shaft so as to advance or retard the operation of any one of the compressed air valves in relation to the others. It will be appreciated that by suitably adjusting or forming the cams the feeder timer can be arranged to control the operation of each of the plungers, and their associated shearing means in accordance with the mode of operating or the demands of the forming machine.

In the arrangement illustrated means is also provided for imparting rotary movement to the plungers. For this purpose, the guides f, f are rotatably mounted in a casing t and are formed with intermeshing teeth f3, f3, the upper ends of the plunger stems e, e, being squared and slidable axially within the geared or guide members f, f. In addition, each of the members f, f is formed with ratchet teeth as shown at f1, and f2, those shown at f1 being formed to impart rotation in the opposite direction to those shown at f2. Journalled on upward extensions of the members f, f, so that they are free to rotate thereon, are pawl carrying arms f4, f4, each of which carries a pawl f5 and has spur teeth formed on it meshing with a rack f7 formed on an extension of a piston rod f8. By this arrangement a movement of the rack f7 in one direction, for instance towards the right, will cause a clockwise rotation of the arms f4, f4 with the result that one of the plungers will be rotated while the pawl f5 associated with the other will pass idly over the teeth of the member f through which the plunger passes. Similarly a return movement of the rack will cause a rotary movement of the plunger which is not affected by the previous movement of the rack. Plunger rotating means, however, are entirely optional and can, in many instances, be dispensed with.

Having thus described my invention, what I claim as new therein and desire to secure by Letters Patent, is:—

1. A glass feeding device comprising the combination of a container for molten glass having a plurality of outlet openings therein through which the glass may issue, and a plurality of vertically movable plungers each of which is arranged in axial alignment with one of the outlet openings, characterized by the provision of a separate actuating means for reciprocating each individual plunger, the said actuating means being so correlated and arranged that the plungers are caused to act upon the mass of glass in the container at different times and in predetermined sequence.

2. A glass feeding device comprising the combination of a container for molten glass having a plurality of outlet openings therein through which the glass may issue, and a plurality of vertically reciprocatory plungers each of which is arranged in axial alignment with one of the outlet openings, characterized by the provision of a separate fluid pressure actuated means for reciprocating each individual plunger, the said separate fluid pressure actuated means being so correlated and arranged that the plungers are caused to act upon the mass of the glass in the container at different times and in a predetermined sequence.

3. A glass feeding device comprising the combination of a container for molten glass having a plurality of outlet openings therein through which the glass may issue, and a plurality of vertically reciprocable plungers one to each outlet opening, characterized by the provision of a separate pneumatically and adjustably operable means for vertically reciprocating each individual plunger, the said pneumatically and adjustably operable means being so correlated and arranged that the plungers are caused to act upon the mass of the glass in the container at different times and in a predetermined sequence.

4. A glass feeding device comprising the combination of a container for molten glass having a plurality of outlet openings therein through which the glass may issue, a plurality of vertically movable plungers each of which is arranged in axial alignment with one of the outlet openings and a separate actuating means for reciprocating each of the individual plungers, the said separate actuating means being so correlated and arranged that one of the individual plungers is caused to ascend while another descends through the mass of the glass whereby speed of operation of the feeding device is increased and the time interval between successive mold charges is reduced.

5. A glass feeding device comprising the combination of a container for molten glass having a plurality of outlet openings therein through which glass may issue, a plurality of vertically movable plungers each of which is arranged in axial alignment with one of the outlet openings, a separate adjustable actuating means for vertically reciprocating each of the individual plungers, the said actuating means being timed to cause the plungers to act upon the mass of glass at different times and in predetermined succession, a separate shearing device for each outlet opening and separate adjustable actuating means for each of the shearing devices, the said shearing device actuating means being operable in timed relation with the plunger actuating means.

6. A glass feeding device comprising the combination of a container for molten glass having a plurality of outlet openings therein through which glass may issue, a plurality of vertically movable plungers each of which is arranged in axial alignment with one of the outlet openings, a plurality of pivotally mounted plunger supporting levers one to each plunger, a plurality of separate fluid pressure actuated means arranged so that each is adapted to displace one of the aforesaid levers and the plunger carried thereby, the said separate fluid pressure actuated means being so correlated and arranged that the plungers are caused to act upon the glass at different times and are operated so that one ascends while another descends, a plurality of shearing means one to each outlet opening, and a plurality of separate shear actuating means operating in timed relationship with the separate plunger actuating means.

7. A glass feeding device comprising the combination of a container for molten glass having a plurality of outlet openings therein through which glass may issue, a plurality of vertically movable plungers each of which is arranged in axial alignment with one of the outlet openings, a plurality of pivotally mounted plunger supporting levers one to each plunger, a plurality of separate fluid pressure actuated means arranged so that each is adapted to displace one of the aforesaid levers and the plunger carried thereby, the said separate fluid pressure actuated means being so correlated and arranged that two of the plungers are, at one instant, moving in opposite directions whereby the normal time interval between successive mold charges is reduced.

8. A glass feeding device comprising the combination of a container for molten glass having a plurality of outlet openings therein through which the glass may issue and a plurality of vertically movable plungers each of which is arranged in axial alignment with one of the outlet openings characterized by the provision of a separate actuating means for each of the individual plungers, the said separate actuating means being so correlated and arranged that one plunger moves up while another moves down whereby the normal time interval between successive mold charges is reduced in the ratio of the number of plungers employed.

EDGAR PHILIP DORMAN.